US007120934B2

(12) United States Patent
Ishikawa

(10) Patent No.: US 7,120,934 B2
(45) Date of Patent: Oct. 10, 2006

(54) SYSTEM, METHOD AND APPARATUS FOR DETECTING, IDENTIFYING AND RESPONDING TO FRAUDULENT REQUESTS ON A NETWORK

(76) Inventor: Mark M. Ishikawa, 3150 Almaden Expressway, Suite 234, San Jose, CA (US) 95118

( * ) Notice: Subject to any disclaimer, the term of this patent is extended or adjusted under 35 U.S.C. 154(b) by 670 days.

(21) Appl. No.: 09/821,565

(22) Filed: Mar. 29, 2001

(65) Prior Publication Data

US 2001/0039623 A1 Nov. 8, 2001

Related U.S. Application Data

(60) Provisional application No. 60/193,654, filed on Mar. 30, 2000, provisional application No. 60/200,054, filed on Apr. 27, 2000.

(51) Int. Cl.
*G06F 12/14* (2006.01)
(52) U.S. Cl. .......................... 726/23; 713/163; 726/11; 726/12; 726/13; 726/22; 709/238; 709/242; 370/401; 370/432
(58) Field of Classification Search ........ 713/153–154, 713/200–202, 172, 163; 380/51; 705/5; 726/11, 12, 13, 3, 22; 709/238, 242; 370/389, 370/390, 392, 401, 432
See application file for complete search history.

(56) References Cited

U.S. PATENT DOCUMENTS

| | | | | |
|---|---|---|---|---|
| 6,021,115 A | * | 2/2000 | Simpson et al. | ............ 370/235 |
| 6,137,782 A | * | 10/2000 | Sharon et al. | .............. 370/255 |
| 6,285,748 B1 | * | 9/2001 | Lewis | ................... 379/112.01 |
| 6,327,620 B1 | * | 12/2001 | Tams et al. | ................. 709/224 |
| 6,363,056 B1 | * | 3/2002 | Beigi et al. | ................. 370/252 |
| 6,578,147 B1 | * | 6/2003 | Shanklin et al. | ............ 713/200 |
| 6,587,432 B1 | * | 7/2003 | Putzolu et al. | .............. 370/229 |
| 6,697,370 B1 | * | 2/2004 | Doi et al. | ............. 370/395.21 |
| 6,725,263 B1 | * | 4/2004 | Torres | ........................ 709/223 |
| 6,725,378 B1 | * | 4/2004 | Schuba et al. | ............. 713/201 |
| 6,865,672 B1 | * | 3/2005 | Carmeli | ..................... 713/155 |
| 6,885,675 B1 | * | 4/2005 | Gibbings | .................... 370/433 |

FOREIGN PATENT DOCUMENTS

| | | | |
|---|---|---|---|
| KR | 1020000012194 | * | 3/2000 |
| KR | 1020000072707 | * | 12/2000 |

OTHER PUBLICATIONS

Schnackenberg et al., "Infrastructure for Intrusion Detection and Response", Proceedings of the DARPA Information Survivability Conference and Exposition (DISCEX), 2000.*

* cited by examiner

*Primary Examiner*—Jacques H. Louis-Jacques
*Assistant Examiner*—Tongoc Tran
(74) *Attorney, Agent, or Firm*—Orrick, Herrington & Sutcliffe LLP

(57) ABSTRACT

Embodiments of the invention are directed to a detection system, method and apparatus that identifies and eradicates fraudulent requests on a network. Embodiments of the detection system comprise at least one router, a server, and an activity monitoring system. The activity monitoring system comprises a route arbiter and a traffic analyzer, wherein the route arbiter monitors the activity on the router. The route arbiter continuously monitors the router and firewall device to determine if abnormal activity or traffic patterns are emerging. If a determination is made that abnormal activity or abnormal traffic patterns exist, the activity monitoring system responds by blocking the activity or redirecting the traffic.

35 Claims, 4 Drawing Sheets

SYSTEM, METHOD AND APPARATUS FOR DETECTING, IDENTIFYING AND RESPONDING TO FRAUDULENT REQUESTS ON A NETWORK

RELATED APPLICATIONS

This application claims priority from provisional patent applications, Ser. Nos. 60/193,654 filed Mar. 30, 2000, entitled "System, Method and Apparatus For Preventing Transmission of Data On A Network", and 60/200,054 filed Apr. 27, 2000, entitled "System, Method and Apparatus For Preventing Transmission of Data On A Network", which are fully incorporated herein by reference.

FIELD OF THE INVENTION

This invention is directed to a detection system, method and apparatus that identifies and eradicates fraudulent requests. More specifically, the detection system utilizes an activity monitoring system which monitors network devices, such as routers and firewalls, and determines whether abnormal activity or traffic patterns are emerging on the devices. If a determination is made that abnormal activity or abnormal traffic patterns exist, the activity monitoring system responds by blocking the activity or redirecting the traffic.

BACKGROUND OF THE DISCLOSURE

Terrorist attacks on networks, in particular, wide area networks, such as the Internet or World Wide Web ("WWW"), are increasing in frequency due to the fairly unstructured management, and relatively easy accessibility, of network systems. Network attacks can paralyze communications and transmission of data for significant periods of time. The suspension of the ability to communicate and transmit data can interrupt commerce for merchants, or even specific institutions, as well as, individuals.

Overall, a network is an assembly of devices, including routers or switches, servers, workstations and network computing devices. The servers, workstations and network computing devices create the infrastructure within the network that performs various tasks, such as, for example, storing data and processing data. Typically, the infrastructure devices are configured within an autonomous network, wherein the infrastructure within the specific autonomous network typically shares similar policies and protocols. The routers or switches connect these autonomous network infrastructures together and provide the communication path by which information is transmitted within the network.

More specifically, switching devices and routers are devices that facilitate communication within, and between, networks. Indeed, switching devices and routers direct traffic to appropriate destinations such that more efficient traffic management is available and information can reach its destination within a reasonable amount of time. In most networks, switching device are connected to, or service, specific network objects or routes. Worldwide, within network systems, groups of switching devices and routers can be connected such that each switching device in the group is aware of the network objects that each of the other switching devices service. In this manner, an incoming destination request can be more efficiently directed.

Switching devices and routers communicate with other devices, such as, for example, other switching devices or routers, by advertising information and passively receiving information. Switching devices and routers are configured to advertise routes, that is, paths between various destinations, and network objects, or devices, to which the switching device or router is physically coupled. In addition to advertising its information, a switching device or router is capable of receiving routes or network objects from the peer routers, that is, neighboring routers, or those switching devices and routers to which a transport connection can be established. In this manner, if a switching device or router does not service a particular address, it can determine whether any of the group routers service the address. If one of the group routers service the address, the incoming traffic is directed to the particular router that services the desired address. Typically, at least one edge router (discussed below) is coupled to the group routers so that information can be received from other networks as well. If none of the group routers connect with the address requested from the incoming traffic, and no edge router announces the network object, the router reports the destination as unreachable; that is, the destination address cannot be reached from this network.

A server is a storage medium for data files and other information, and is typically utilized to deliver information to multiple clients, or users. Many types of servers exist, including, for example, but not limited to, a web server, a file server, a database server and a terminal server. Typically, all servers are capable of servicing a finite number of connections, i.e., requests. If the server receives too many requests during a given period of time, repeatedly receives bogus information, bad source IP, or the like, the server is generally unable to service the requests. The server's resources become overloaded and the server crashes, that is, the server fails, or the server tries to suspend processing until resources are released. However, in the event of an attack on the server, resources are captured by the incoming requests and thus, the server is unable to recapture resources to process the requests. In this situation, the server typically crashes.

In addition to the routers and infrastructure devices, another device, known as a firewall, is typically found in a network. Although a firewall is not a necessary component of the network, the firewall typically protects the switching devices or routers and infrastructure devices from unscrupulous or undesired transmissions and verifies the recipients receiving the information.

A firewall is analogous to a gate that prevents certain traffic from being transmitted to a particular destination, such as, a server. Typically, a firewall is configured to allow certain types of network connections access through the firewall by implementing security requirements to the traffic, including, for example, packet filtering, authentication and encryption. Generally, a firewall is configured to determine abnormal levels of network activity, such as, for example, multiple requests from the same address and frequent illegal connection attempts.

As is commonly understood, multiple networks exist and can operate independently from each other. However, for more efficient communication, networks are coupled together to share information. All of the major networks are connected utilizing globally unique numbers known as an Autonomous System Number ("ASN"). Each network is assigned a unique ASN and all of the ASN network participants operate in accordance with common policies.

To effectively communicate between the various networks, a device known as an edge router is utilized. Edge routers operate similar to the manner in which routers within a network operate. However, to couple the multiple autonomous networks together, edge routers utilize a protocol known as Border Gateway Protocol ("BGP"). Edge routers advertise and receive route objects from other network edge routers through a process commonly referred to as "peering". Peering is a process by which two or more routers broadcast or announce the route objects that they control, or have connectivity to, so that a routing or policy decision can be made as to where to transmit a packet of information. Currently, implementation of BGP determines the routing preference based upon the number of autonomous systems that the particular information packet must traverse prior to its final destination. Unfortunately, this policy does not currently consider network issues, such as, network segment load, or poor connectivity of the chosen route.

In operation, a request for access to information, or a particular destination, or address, emanates from a user computer on the network, or from another network. With reference to FIG. 1, in a network system environment, the user's computer is coupled to a specific core router that attempts to direct the user's request to the appropriate address. If the router services the requested address, the router coupled to the user's network directs the request to the address. If however, the router does not service the address, the router forwards the incoming information to an edge router in an attempt to deliver or transmit the packet. If the user's core router still does not find the address, via another known router, for example, the edge router, a determination is made that the destination is unreachable.

Once the address is located, if no firewall blocks the request from being transmitted, or the security restrictions of the firewall do not prevent the request from being transmitted, the request is transmitted to the server containing the requested destination address through the associated core router. In this manner, the user's request accesses the server without restriction. Due to the virtually unrestricted nature of transmissions for most servers, unscrupulous users can "flood" a server with multiple task requests, such as, for example, a requests that includes a return destination address that does not exist. Upon receipt of the request, the server will attempt to respond to the non-existent, or incorrect, address. If hundreds or thousands of bogus requests are made to a specific server, the resources of that server, the routers, or the firewall, guarding the server, are severely impacted such that normal traffic cannot successfully transmit to the server.

For example, a web server, which is capable of servicing thousands of clients per hour, listens to a network component known as a socket or port, such as, for example, port 80. Typically, all incoming web based requests are directed to port 80 on a web server's IP address. The structure of a web server's IP address is commonly understood and will not be further described herein. When an attack is launched on a web server, all of the requests, typically thousands of requests, are directed to port 80. As the web server is only capable of servicing a finite number of requests, the web server ultimately crashes or is unable to service the incoming requests, if the number of requests is not suspended. One possible defense against an attack is to protect or guard the server by a firewall that will determine abnormal levels of activity. However, this does not solve the problem, as it does not address the network load issue that can potentially lead to a crash or network resource overload at the firewall device.

To efficiently operate a network within the configuration of a collection of networks, such as, the Internet, the firewall must allow certain types of traffic to pass. Thus, as stated above, any individual network can be subjected to unscrupulous acts emanating from another network. In the event of an attack on the individual network, the firewall is limited in its actions; namely, the firewall can prevent the attacker, i.e., the problematic traffic, from passing through the firewall. Thus, if the firewall is protecting the server, the server will be prevented from receiving the flood of requests. In these instances, the firewall will either acknowledge or ignore the bogus request. If the firewall acknowledges, but rejects the request, the request is transmitted back to the originator. If the return address is false or otherwise inaccurate, the network connecting the firewall to the router can become "flooded" or saturated as the connecting network is unable to process the packets of information. The unprocessed packets overtax the resources of the router, as the router is unable to process the information, and further, is unable to dispose of the rejected packets of information from the firewall. Thus, ultimately, the router, or one of the devices, crashes, or overloads, which causes the network connecting the devices to crash or collapse.

As discussed above, the current attempts to eliminate fraudulent requests to a server, or its firewall, are limited to blocking the source address, and preventing repeated requests to respond to one address via blocking the request. Although these mechanisms can prevent fraudulent requests from being sent to, or received by, the server, to prevent the transmission of requests from the suspected traffic, the network device receiving the requests, such as, the routers or firewall, must review each incoming packet. Thus, although these requests can be identified, the identification of these requests require that the network device, such as, the router or firewall, look at each incoming packet to determine whether to block the transmission. As such, these solutions do not prevent the stifling of traffic flow and often still result in the router, firewall or server from being paralyzed as the problem is merely shifted between the devices within the network. A need in the industry exists for a system and apparatus that can identify emerging problematic traffic patterns on a network and efficiently redirect the traffic without affecting the resources of other network devices.

SUMMARY OF THE DISCLOSURE

Embodiments of this invention is directed to a detection system, method and apparatus that identifies and eradicates fraudulent requests on a network. Embodiments of the detection system comprise at least one router, a server, and an activity monitoring system. In some preferred embodiments, the detection system further comprises a firewall.

The router, firewall (if included) and server are coupled together and operate in accordance with well-understood transmission operations. In preferred embodiments, the firewall is governed in accordance with predefined parameters that determine and monitor activity.

The activity monitoring system comprises a route arbiter and a traffic analyzer, wherein the route arbiter monitors the activity on the router. The route arbiter continuously monitors the router and firewall device to determine if abnormal activity or traffic patterns are emerging. If a determination is made that abnormal activity or abnormal traffic patterns exist, the activity monitoring system responds by blocking the activity or redirecting the traffic.

A feature of preferred embodiments is the use of the route arbiter to detect unusual traffic patterns. An advantage to this feature is that the resources of the system are not utilized in analyzing and managing fraudulent transmissions, thereby interfering with normal use and operation of the system.

A further feature is the use of the traffic analyzer to receive and analyze the suspected traffic. An advantage to this feature is that the network path between the router and the firewall is relieved of the excessive influx of suspicious traffic as the suspicious traffic is directly transmitted to the traffic analyzer, and thereby allows the transmission of legitimate traffic between the router and the firewall.

A still further feature is the ability of the traffic analyzer to block a network object from being advertised to an offending network, that is, a network forwarding suspicious traffic. An advantage to this feature is the reduction of excessive traffic on network devices and an alleviation of excessive resource allocation.

The above and other advantages of embodiments of this invention will be apparent from the following more detailed description when taken in conjunction with the accompanying drawings. It is intended that the above advantages can be achieved separately by different aspects of the invention and that additional advantages of this invention will involve various combinations of the above independent advantages such that synergistic benefits may be obtained from combined techniques.

BRIEF DESCRIPTION OF THE DRAWINGS

The detailed description of embodiments of the invention will be made with reference to the accompanying drawings, wherein like numerals designate corresponding parts in the figures.

DETAILED DESCRIPTION OF PREFERRED EMBODIMENTS

Embodiments of the present invention are directed to a detection system, method and apparatus that identifies and eradicates fraudulent requests on a network. More specifically, the detection system utilizes an activity monitoring system which monitors the network devices, such as a router and firewall, and determines whether abnormal activity or traffic patterns are emerging on these devices. If a determination is made that abnormal activity or abnormal traffic patterns exist, the activity monitoring system responds by blocking the activity or redirecting the traffic.

Figure 1:
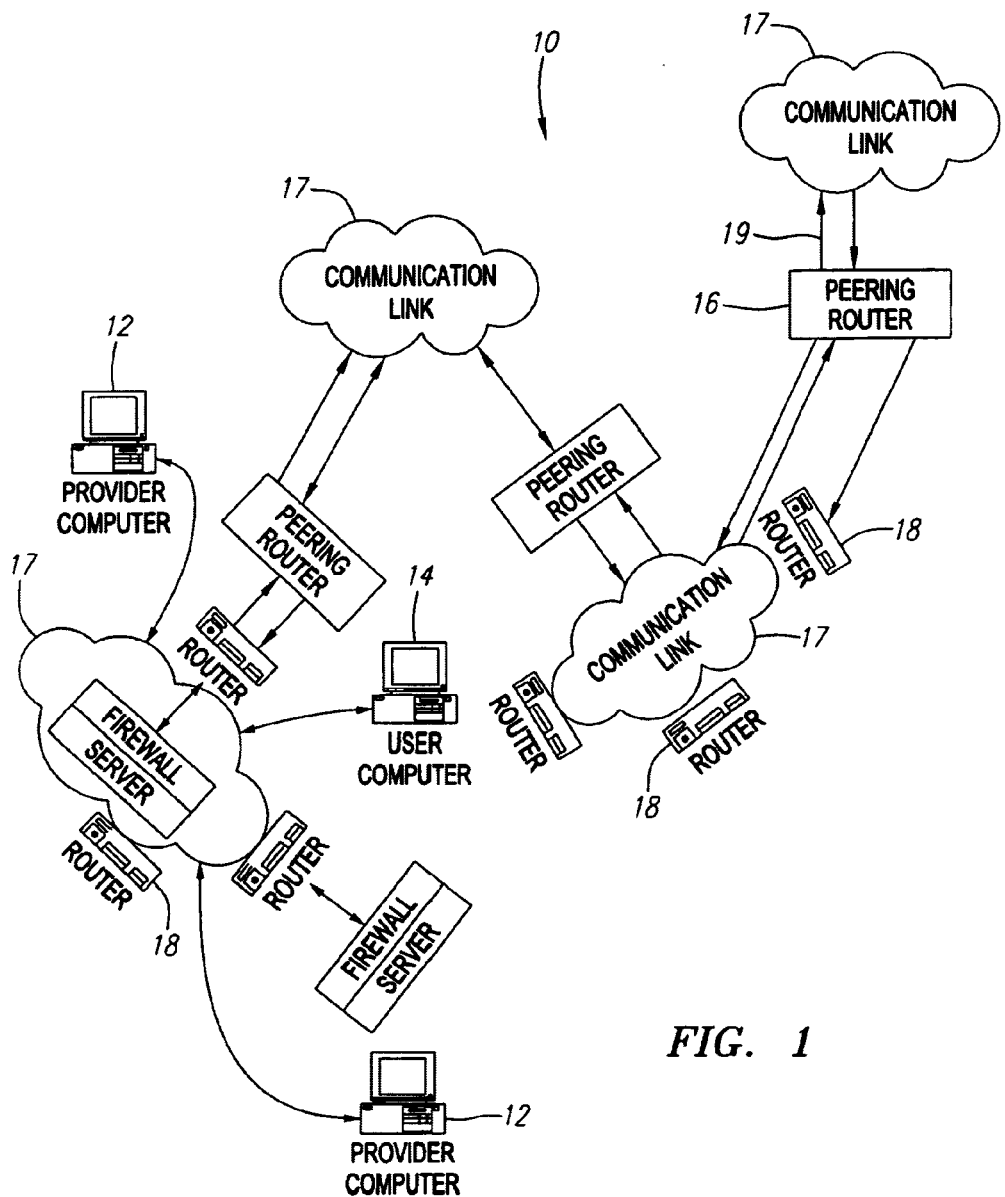
FIG. 1 is a network system environment in accordance with a preferred embodiment of the present invention.

Hardware Environment:

As discussed above, preferred embodiments of the instant invention operate in concert with a plurality of networked computers, such as, for example, a user computer and a server computer which are coupled together on a communications network, such as, for example, the Internet or a wide area network. FIG. 1 depicts a network system 10 that operates in accordance with preferred embodiments of the invention. In preferred embodiments, the network system 10 includes a server 12, or a provider computer, a client, or user computer 14, at least one edge or peering router 16 and at least one core router 18, wherein the server computer 12, the user computer 14, and the core router 18 are in electronic communication with each other via a communication link 17, and wherein the edge router 16 couples communication between the networks via a communication link 19. It is to be understood that embodiments of this invention can operate on single network. In this instance, no edge router 16 is required or included in the system.

In some preferred embodiments, the network system 10 includes a plurality of either the server computer 12, the user computer 14, the edge router 16, core router 18, or any combination thereof. The server computer 12 contains a variety of data that is accessible by the user computer 14 or clients. The network 10 includes one or more (and preferably a plurality of) servers 12 that are operatively connected to the communication link 17, and operatively connected between networks via the communication link 19.

The provider computer 12, or server, may comprise any suitable network device capable of providing content (data representing text, hypertext, photographs, graphics video and/or audio) for communication over the network. In preferred embodiments, the provider computer 12 comprises a programmable processor capable of operating in accordance with programs stored on one or more computer readable media to provide content for communication to a user computer 14. The provider computer 12 may comprise, for example, but not limited to, a personal computer, a mainframe computer, network computer, portable computer, personal digital assistant (such as, a 3Com Palm Pilot), or the like.

In a preferred wide area network environment, such as, the Internet environment, the provider computer 12 is controlled by suitable software to respond to a valid request for content by providing (or downloading) data in the form of one or more HTML files to the user computer 14 from which the request was made. As discussed above, the edge routers 16 and core routers 18 facilitate these transmissions as dictated by the particular network environment. The communication link 17 may include a public network, such as the Internet, a local area network, or any other suitable communications connection, hardwired, wireless, or a hybrid thereof.

The user computer 14 may comprise any suitable network device capable of communicating with other network devices in the network system. In preferred embodiments, the user computer comprises a programmable processor, a display device, and a user input device. In one preferred embodiment, the user computer comprises a personal computer system having a CRT display, a keyboard and a mouse user-input device.

The user computer 14 is controlled by suitable software, including network communication and browser software to allow a user to request, receive and display information (or content) from or through a provider computer 12 on the network system 10. The user computers 14 are any means capable of communicating with the server computers 12, including, but not limited to, personal computers, stand alone media including hard drives, CD ROMs, DVD Roms, kiosks and ATM-type machines. The user computers 14 access the server computers 12 via the wide area network or through some other remote access, such as, for example, by telephone, facsimile, personal digital assistant, pulse code system, web TV, or any other device or method the communicates alpha numeric data with a server.

Figure 2:
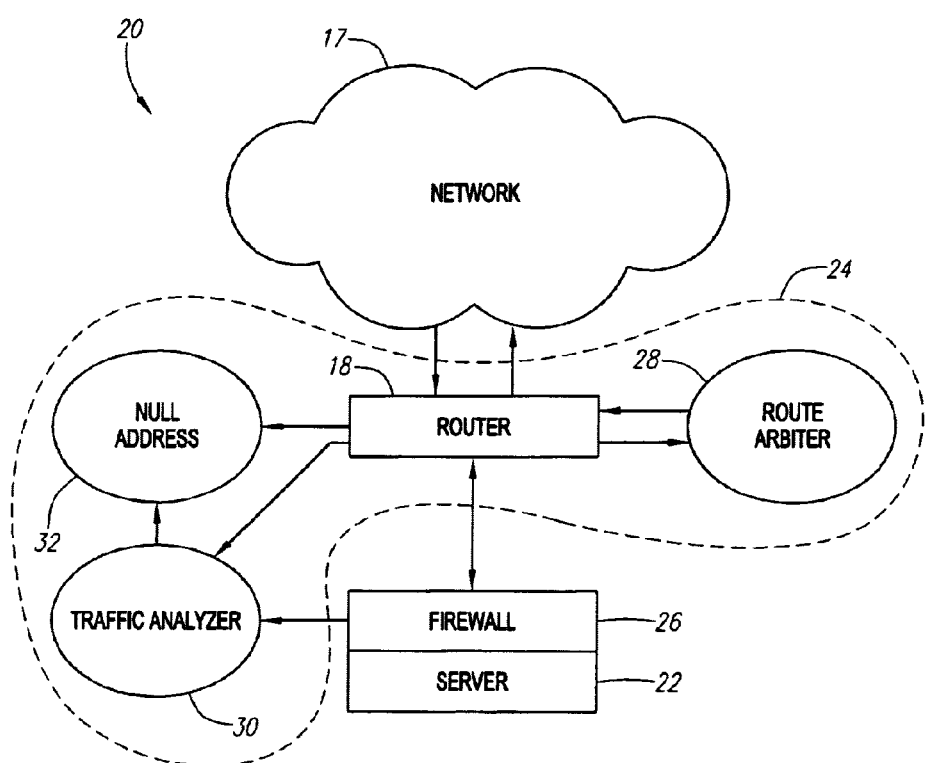
FIG. 2 is a representation of an activity monitoring system in accordance with the preferred embodiment of FIG. 1.

General Description of Preferred Embodiments:

Embodiments of the instant invention are directed to a detection system that identifies and eradicates fraudulent requests. With reference to FIG. 2, embodiments of the detection system 20 comprise at least one switching device 18 or other similar device, a server 22, and an activity monitoring system 24. In some preferred embodiments, the detection system further comprises a firewall 26.

The switching device 18, firewall 26 (if included) and server 22 are coupled as described above and operate in accordance with well-understood transmission operations. In preferred embodiments, the firewall 26 is governed in accordance with predefined parameters that determine and monitor activity. The operator of the server generally defines the parameters for the firewall 26. In some preferred embodiments, the switching device is a router. In still another preferred embodiment, a router can be used in conjunction with the switching device 18.

The activity monitoring system 24 comprises a route arbiter 28 and a traffic analyzer 30. In one preferred embodiment, the route arbiter 28 is coupled to the firewall 26 and the switching device 18. In preferred embodiments, the route arbiter 28 is an independent computer, such as, a personal computer, which can be independently operated by an operator, or other authorized personnel.

The route arbiter 28 monitors the activity on the switching device 18. The route arbiter 28 continuously "looks" or monitors the switching device 18 and firewall device to determine if abnormal activity or traffic patterns are emerging. The route arbiter 28 communicates with the switching device 18 and the firewall 26 via various methods, including, but not limited to, remote monitoring network ("RMON") probes, SysLog entries from the firewall and switching device, and Ethernet probes. It is to be understood that various devices have preferred methods of connectivity and this is not intended to limit the manner in which the route arbiter will be connected or communicate with hardware devices. Indeed, any device capable of monitoring the traffic on the switching device 18 and the firewall 26 is suitable and this description is not intended to be limiting. For instance, in preferred embodiments, the route arbiter 28 and the traffic analyzer 30 may be incorporated into the switching device 18 or a router.

Further still, in other preferred embodiments, other combinations of devices may be used, including a system wherein the route arbiter 28 is incorporated within the switching device 18 (and/or router) and the traffic analyzer 30 is maintained as a separate device, or wherein the route arbiter 28 and the traffic analyzer 30 is incorporated within switching device 18 (and/or router), or traffic analyzer 30 is incorporated within the switching device 18 (and/or router) and the route arbiter 28 is maintained as a separate device, or any combination thereof.

If the activity on the network, for example, between the switching device 18 and the firewall 26, exceeds predefined acceptable parameters, or exhibits abnormal traffic patterns, the route arbiter 28 instructs the switching device 18 to direct the traffic to the traffic analyzer 30. In preferred embodiments, the traffic analyzer 30 monitors traffic it receives and makes a determination as to whether the influx of traffic is changing. In particular, the traffic analyzer 30 determines whether the traffic is increasing, decreasing or remaining the same in volume. If the traffic is not decreasing in volume, at a predefined threshold level, for example, the volume over a given time, the traffic analyzer 30 instructs the switching device 18 to cease announcing the server network address to the offending network. As such, the problematic traffic is no longer directed to the switching device 18 and thus, the server network containing switching device 18 becomes unreachable to the offending network transmitting the problematic traffic.

In some embodiments the traffic is directed to a null address or a 'black hole', that is, a switching device 18 or computer that accepts network traffic but does not respond to the traffic, such that, the route of the traffic effectively ceases. Indeed, the black hole is a switching device, or similar device, that is not connected to any addresses or other routes. As the black hole does not attempt to retransmit the transmission, no additional resources of the system are utilized. In this manner, the switching device 18, firewall 26 and server are not continuously affected by the fraudulent transmissions and the network between the firewall 26 and switching device 18 can be cleared for valid traffic transmission. In some preferred embodiments, the traffic analyzer 30 or switching device 18 can function as the 'black hole'.

In some embodiments, the traffic analyzer 30 also accepts fraudulent traffic transmissions from the firewall 26. All transmissions from the firewall 26 to the traffic analyzer 30 are ultimately directed to the black hole. In this manner, the firewall 26, which 'hears' instructions from the route arbiter 28, does not waste resources attempting to analyze whether the transmissions are legitimate. Once the fraudulent transmissions have ceased, the route arbiter 28 instructs the switching device 18 to accept transmissions previously rejected. As the firewall 26 also 'hears' the instructions, the firewall 26 accepts the previously rejected route objects and stops directing them to the traffic analyzer 30. It is to be understood that the activity monitoring system 24 can comprise as many or as few devices as required to perform the above described tasks. Indeed, in one embodiment, the activity monitoring system 24 consists of a single device, such as, a computer, wherein the single device monitors the traffic and analyzes the traffic.

Figure 3:
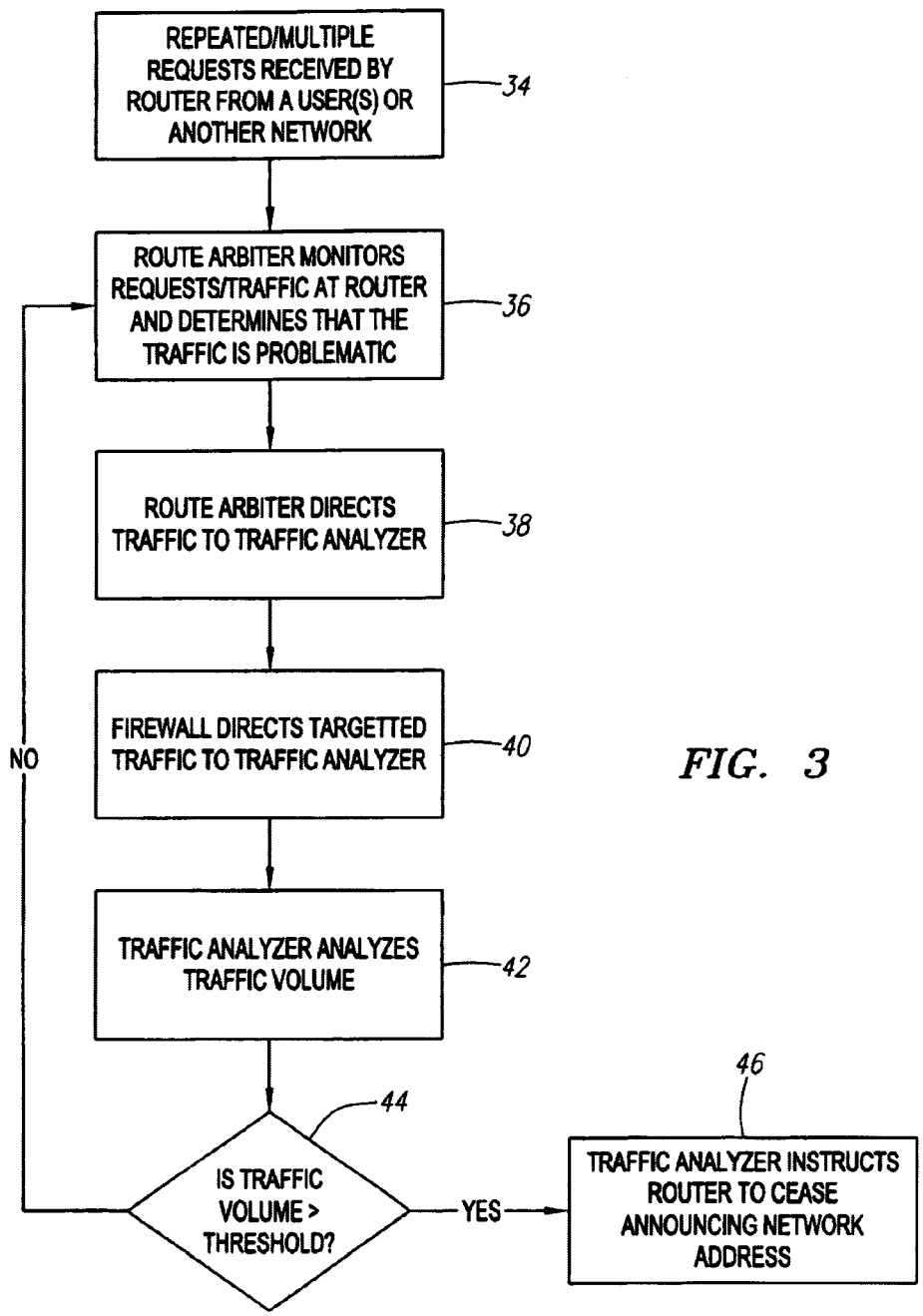
FIG. 3 is a block diagram of a preferred method of operation of the activity monitoring system.

With reference to FIG. 3, in operation, multiple requests or transmissions from an unscrupulous user, or group of users, are sent via the network to the switching device 18. Typically, the user's transmission includes a bogus return address such that the transmission cannot be returned. The route arbiter 28, which is monitoring the switching device 18 and incoming traffic packets, determines that the incoming requests are problematic 36. For instance, the switching device may detect an abnormal traffic pattern, including, but not limited to, a high volume of requests from a single IP address, numerous TCP-IP connect statements without any data requests (also known as resource hogging) or multiple attempts from an invalid address. The route arbiter 28 directs the switching device 18 to redirect the incoming packets to the traffic analyzer 38 and, in some instances, ultimately to the black hole.

The firewall 26, which is also listening to the route arbiter 28, also directs any targeted packets that have been transmitted by the switching device to the traffic analyzer 40. The traffic analyzer analyzes the traffic volume. If the traffic exceeds a threshold volume, or exhibits some other targeted behavior, the traffic analyzer instructs the switching device to cease announcing the network 42. The captured transmissions are, in some instances, ultimately delivered to the black hole, or remain within the traffic analyzer. Once the route arbiter 28 determines that the traffic patterns have returned to normal, the route arbiter 28 instructs the switching device 18 to recommence transmission of all data to the firewall 26 or other appropriate network device, and to resume announcing the network address.

Figure 4:
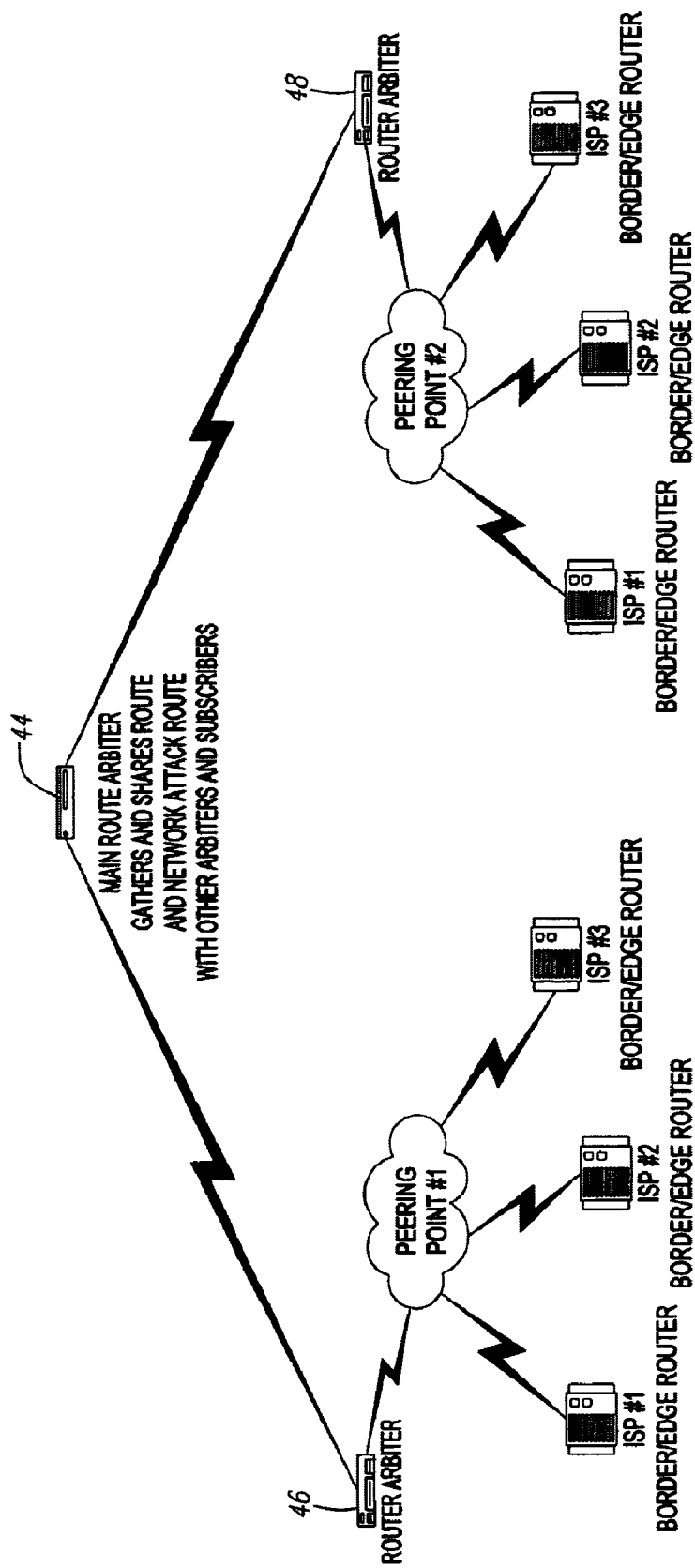
FIG. 4 is a schematic representation of a service bureau in accordance with a preferred embodiment.

The above-described system can be adopted and implemented through a service bureau, wherein the service bureau has at least one main route arbiter 44. In this embodiment, with reference to FIG. 4, participating networks would register with the service bureau, wherein each participating network includes a route arbiter 46, 48. The service bureau is coupled to the participating networks' route arbiters. In the event of an attack of one of the participating networks, the target network, upon receipt of notification from the attacked target network, the service bureau would notify all of the participating networks to cease announcing the offending network or to advertise a more preferable route to draw the offending traffic away from the target network. In addition to responding to relief requests from attacked networks, the service bureau could also monitor the activity of each of the route arbiters so as to alert all of the participating networks of a potential problem.

Although the above embodiments have been described in accordance with currently existing protocols, including, but not limited to Border Gateway Protocol ("BGP"), Interior Border Gateway Protocol ("IBGP"), OSPF and EIGRP, it is to be understood that the system can be easily adapted to incorporate or operate in accordance with newly developed or modified protocols. Indeed, in one embodiment of the present invention, unlike current BGP protocol, routing preferences are determined with reference to a routing table, wherein the routing table defines all known routes to a particular network device. In this embodiment, the determination of the manner in which to route traffic, or information packets, is based, in part, upon the amount of time it takes a test packet, or other timed packet, to reach a specified location on the network. In contrast to the current protocol, it is not solely based on the number of autonomous systems that the packet of information must traverse to reach a destination. Indeed, in this embodiment, the determination of the manner in which to route traffic is based, in part, on an analysis of the network load and an analysis of the availability of connections or links between the autonomous systems.

Further still, embodiments of the present invention could be utilized to defend from a relatively new type of attack; namely, a flooding of false routing information. In these instances, the system would further monitor the broadcast routing information, wherein suspicious, illegal or unusual amounts of route updates are detected. For instance, in one embodiment, international router arbiters are located at locations throughout the world, referred to as peering points. These arbiters collect all of the routing information transmitted between the ISP and determines whether valid routing information is being transmitted by an ISP. The subscribers to this service will receive the information gathered by the international route arbiters and determine if the routing information they receive from their peers is valid or bogus. If the routing information they receive is bogus, they will stop accepting the bogus information. In an alternative embodiment, the international route arbiters advertise a more specific or preferential route object. The more specific route object is designed to draw the attacking traffic away from the targeted network, and send the traffic to a black hole interface.

Although the foregoing describes the invention in accordance with various illustrated and described embodiments, this is not intended to limit the invention. Rather, the foregoing is intended to cover all modifications an alternative constructions falling within the spirit and scope of the invention as expressed in the appended claims.

What is claimed is:

1. A system for identifying and diverting problematic information packets transmitted from a first network device to a second network device, comprising:
  a switching system that provides a network address of the second network device to the first network device, said switching system receiving information packets from the first network device and directing the information packets to the second network device;
  a route arbitration system that monitors the information packets received by said switching system, said route arbitration system determining whether the information packets comprise abnormal network activity in accordance with a first predetermined criteria and, if said route arbitration system determines that the information packets comprise abnormal network activity, identifying the information packets as being abnormal information packets;
  a traffic analysis system that monitors the abnormal information packets identified by said route arbitration system, said traffic analysis system determining whether the abnormal information packets are problematic in accordance with a second predetermined criteria and, if said traffic analysis system determines that the abnormal information packets are problematic, identifying the abnormal information packets as being the problematic information packets and inhibiting said switching system from broadcasting the network address of the second network device to the first network device,
  wherein said switching system, when inhibited, renders the second network device unreachable and prevents the first network device from transmitting the problematic information packets to said switching system; and
  a firewall system that identifies suspect information packets received from the first network device, said switching system directing the information packets to the second network device via said firewall system, wherein said traffic analysis system determines whether the suspect information packets are problematic and, if said traffic analysis system determines that the suspect information packets are problematic, inhibits said switching system from broadcasting the network address of the second network device to the first network device.

2. The system of claim 1, wherein said switching system includes a routing system.

3. The system of claim 1, wherein said route arbitration system is at least partially incorporated into said switching system.

4. The system of claim 1, wherein said route arbitration system communicates with said switching system via at least one communication link selected from the group consisting of a remote monitoring network probe, a switching device, and an Ethernet probe.

5. The system of claim 1, wherein said route arbitration system monitors a volume of the information packets.

6. The system of claim 5, wherein said route arbitration system determines that the information packets comprise said abnormal network activity when the volume of the information packets is greater than a preselected volume threshold level.

7. The system of claim 1, wherein said route arbitration system, upon determining that the information packets no longer comprise said abnormal network activity, enables said switching system to again provide the network address of the second network device to the first network device and receive the information packets from the first network device.

8. The system of claim 1, wherein said traffic analysis system is at least partially incorporated into said switching system.

9. The system of claim 1, wherein said traffic analysis system monitors a volume of the abnormal information packets.

10. The system of claim 9, wherein said traffic analysis system determines that the abnormal information packets are problematic when the volume of the abnormal information packets is greater than a preselected volume threshold level.

11. The system of claim 9, wherein said traffic analysis system determines that the abnormal information packets are problematic when the volume of the abnormal information packets does not decrease during a preselected time interval.

12. The system of claim 1, wherein said traffic analysis system instructs said switching system to redirect the information packets to a null network device having a null address, said null network device receiving the information packets and providing no response to the first network device.

13. The system of claim 12, wherein said traffic analysis system instructs said switching system to provide said null address to the first network device such that the first network device transmits the problematic information packets to said null network device.

14. The system of claim 13, wherein said null network device is provided by at least one of said route arbitration system and said traffic analysis system.

15. A system for identifying and diverting problematic information packets transmitted from a first network device to a second network device, comprising:

a switching system that provides a network address to the first network device, said switching system receiving information packets from the first network device and directing the information packets to the second network device;

an activity monitoring system that monitors the information packets received by said switching system, said activity monitoring system determining whether the information packets are problematic in accordance with at least one predetermined criteria and, if said activity monitoring system determines that the information packets are problematic, identifying the information packets as being the problematic information packets and inhibiting said switching system from broadcasting the network address of the second network device to the first network device, wherein said switching system, when inhibited, renders the second network device unreachable and prevents the first network device from transmitting the problematic information packets to said switching system; and said activity monitoring system includes: a route arbitration system that monitors the information packets received by said switching system, said route arbitration system determining whether the information packets comprise abnormal network activity in accordance with a first information packets comprise abnormal network activity, identifying the information packets are being abnormal information packets; and a traffic analysis system that monitors the abnormal information packets identified by said route arbitration system, said analysis system determining whether the abnormal information packets comprises the problematic information packets in accordance with a second predetermined criteria and, if said traffic analysis system determines that the abnormal information packets comprise the problematic information packets, inhibiting said switching system from providing the network information packets, inhibiting said switching system from broadcasting the network address of the second network device to the first network device.

16. The system of claim 15, wherein said activity monitoring system monitors a volume of the information packets and determines that the information packets are problematic when the volume of the information packets is greater than a preselected volume threshold level.

17. The system of claim 16, wherein said activity monitoring system monitors a volume of the information packets that exceed said preselected volume threshold level and determines that the information packets are problematic when the volume of the information packets exceeding said preselected volume threshold level does not decrease during a preselected time interval.

18. A system for identifying and diverting problematic information packets received from an external network device, comprising:

a protected network device having a network address;

a switching system that provides said network address to the external network device, said switching system receiving information packets from the external network device and directing the information packets to said protected network device;

a route arbitration system that monitors the information packets received by said switching system, said route arbitration system determining whether the information packets comprise abnormal network activity in accordance with a first predetermined criteria and, if said route arbitration system determines that the information packets comprise abnormal network activity, identifying the information packets as being abnormal information packets;

a traffic analysis system that monitors the abnormal information packets identified by said route arbitration system, said traffic analysis system determining whether the abnormal information packets are problematic in accordance with a second predetermined criteria and, if said traffic analysis system determines that the abnormal information packets are problematic, identifying the abnormal information packets as being the problematic information packets and inhibiting said switching system from broadcasting the network address of said protected network device to the external network device, wherein said switching system, when inhibited, renders said protected network device unreachable and prevents the external network device from transmitting the problematic information packets to said switching system; and a firewall system that identifies suspect information packets received from the external network device, said switching system directing the information packets to the protected network device via said firewall system, said traffic analysis system determining whether the suspect information packets are problematic and, if said traffic analysis system determines that the suspect information packets are problematic, inhibiting said switching system from broadcasting the network address of the protected network device to the external network device.

19. The system of claim 18, wherein said protected network device comprises at least one network device selected from the group consisting of a server system, a computer system, a provider computer system, a user computer system, a router system, an edge router system, a core router system, and a firewall.

20. The system of claim 18, further comprising a communication system, said switching system communicating with the external network device via said communication system.

21. The system of claim 20, wherein said communication system comprises a communication link selected from the group consisting of a local area network, a wired communication network, a wireless communication network, a wide area network, a public communication network, and the Internet.

22. The system of claim 18, wherein said route arbitration system monitors a volume of the information packets and determines that the information packets comprise said abnormal network activity when the volume of the information packets is greater than a preselected volume threshold level.

23. The system of claim 18, wherein said route arbitration system, upon determining that the information packets no longer comprise said abnormal network activity, enables said switching system to again provide the network address of the protected network device to the external network device and receive the information packets from the external network device.

24. The system of claim 18, wherein said traffic analysis system monitors a volume of the abnormal information packets and determines that the abnormal information packets are problematic when the volume of the abnormal information packets is greater than a preselected volume threshold level.

25. The system of claim 18, wherein said traffic analysis system monitors a volume of the abnormal information packets and determines that the abnormal information packets are problematic when the volume of the abnormal information packets does not decrease during a preselected time interval.

26. The system of claim 18, wherein said traffic analysis system instructs said switching system to redirect the information packets to a null network device having a null address, said null network device receiving the information packets and providing no response to the external network device.

27. The system of claim 18, wherein said traffic analysis system instructs said switching system to redirect the information packets to a traffic analysis device, said traffic analysis device receiving and analyzing the information packets.

28. A method for identifying and diverting problematic information packets transmitted from a first network device to a second network device, comprising:
   providing a network address of the second network device to the first network device via a switching system receiving information packets from the first network device and directing the information packets to said second network device;
   monitoring the information packets received from the first network device;
   determining whether the information packets comprise abnormal network activity in accordance with a first predetermined criteria;
   if the information packets are determined to comprise abnormal network activity, identifying the information packets as being abnormal information packets;
   monitoring the abnormal information packets;
   determining whether the abnormal information packets are problematic in accordance with a second predetermined criteria; and
   if the abnormal information packets are determined to be problematic,
      identifying the abnormal information packets as being the problematic information packets;
      inhibiting said switching system from broadcasting the network address of said second network device to the first network device,
      wherein said switching system, when inhibited, renders the second network device unreachable and prevents the first network device from transmitting the problematic information packets to said switching system; and
      a firewall system that identifies suspect information packets received from the external network device, said switching system directing the information packets to the protected network device via said firewall system, said monitoring system determining whether the suspect information packets are problematic and, if said monitoring system determines that the suspect information packets are problematic, inhibiting said switching system from broadcasting the network address of the protected network device to the external network device.

29. The method of claim 28, wherein said monitoring the information packets includes monitoring a volume of the information packets and wherein said determining whether the information packets comprise said abnormal network activity includes determining that the information packets comprise said abnormal network activity when the volume of the information packets is greater than a preselected volume threshold level.

30. The method of claim 28, wherein said monitoring the abnormal information packets includes monitoring a volume of the abnormal information packets and wherein said determining whether the abnormal information packets are problematic includes determining that the abnormal information packets are problematic when the volume of the abnormal information packets does not decrease during a preselected time interval.

31. The method of claim 28, further comprising determining that the information packets no longer comprise said abnormal network activity and enabling said switching system to again provide the network address of the second network device to the first network device and receive the information packets from the first network device.

32. The method of claim 28, wherein said inhibiting said switching system includes redirecting the information packets to a null network device having a null address, said null network device receiving the information packets and providing no response to the first network device.

33. The method of claim 32, wherein said redirecting the information packets includes instructing said switching system to provide said null address to the first network device such that the first network device transmits the problematic information packets to said null network device.

34. A method for identifying and diverting problematic information packets transmitted from a first network device to a second network device, comprising:
   providing a network address of the second network device to the first network device via a switching system receiving information packets from the first network device and directing the information packets to said second network device;
   monitoring the information packets received from the first network device;
   determining whether the information packets are problematic in accordance with at least one predetermined criteria;
   if the information packets are determined to be problematic,
      identifying the information packets as being the problematic information packets; and
      inhibiting said switching system from broadcasting the network address of said second device to the first network device, wherein said switching system, when inhibited, renders the second network device unreachable and prevents the first network device from transmitting the problematic information packets to said switching system; and a firewall system that identifies suspect information packets received from the external network device, said switching System directing the information packets to the protected network device via said firewall system, said monitoring system determining whether the suspect information packets are problematic and if said monitoring system determines that the suspect information packets are problematic, inhibiting said switching system from broadcasting the network address of the protected network device to the external network device.

35. The method of claim 34, wherein said determining whether the information packets are problematic includes:

determining whether the information packets comprise abnormal network activity in accordance with a first predetermined criteria;

if the information packets are determined to comprise abnormal network activity, identifying the information packets as being abnormal information packets;

monitoring the abnormal information packets; and determining whether the abnormal information packets are problematic in accordance with a second predetermined criteria.

* * * * *